(12) United States Patent
Xu et al.

(10) Patent No.: US 11,663,098 B2
(45) Date of Patent: May 30, 2023

(54) MAINTAINING DURABILITY OF A DATA OBJECT USING UNPLANNED DELTA COMPONENTS DURING TRANSIENT FAILURES

(71) Applicant: VMware, Inc., Palo Alto, CA (US)

(72) Inventors: Yiqi Xu, Redwood City, CA (US); Eric Knauft, San Francisco, CA (US); Enning Xiang, San Jose, CA (US); Ojan Thornycroft, Los Altos, CA (US); Asit Desai, Palo Alto, CA (US); Varun Shah, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/377,128

(22) Filed: Jul. 15, 2021

(65) Prior Publication Data
US 2023/0018790 A1   Jan. 19, 2023

(51) Int. Cl.
*G06F 11/00* (2006.01)
*G06F 11/20* (2006.01)
*G06F 3/06* (2006.01)

(52) U.S. Cl.
CPC .......... *G06F 11/2094* (2013.01); *G06F 3/065* (2013.01); *G06F 3/0619* (2013.01); *G06F 3/0659* (2013.01); *G06F 3/0673* (2013.01); *G06F 2201/82* (2013.01)

(58) Field of Classification Search
CPC .. G06F 11/2094; G06F 3/0619; G06F 3/0659; G06F 2201/82
USPC ....................................................... 714/1–57
See application file for complete search history.

(56) References Cited

U.S. PATENT DOCUMENTS

| | | | |
|---|---|---|---|
| 7,406,575 B2 * | 7/2008 | Lam .................... | G06F 11/1451 709/224 |
| 8,938,429 B1 * | 1/2015 | Bergant .............. | G06F 11/1662 707/645 |
| 2007/0088764 A1 * | 4/2007 | Yoon .................... | H04L 65/1101 |
| 2015/0143170 A1 * | 5/2015 | Andrews ............. | G06F 11/1464 714/15 |
| 2015/0286695 A1 * | 10/2015 | Kadayam ............ | G06F 16/2365 707/639 |
| 2016/0077917 A1 * | 3/2016 | Battepati ............. | G06F 11/1451 714/15 |

(Continued)

*Primary Examiner* — Sarai E Butler
(74) *Attorney, Agent, or Firm* — Barta, Jones & Foley, PLLC

(57) ABSTRACT

The disclosure herein describes enhancing data durability of a base component of a data object using an unplanned delta component during transient fault unavailability. A base component of a data object becoming unavailable due to a transient fault is detected. A delta component associated with the base component is generated, wherein the delta component includes unwritten storage space with an address space and a tracking bitmap including a plurality of bits associated with data blocks of the address space of the delta component. The stale LSN with which the base component is associated is assigned to the delta component and the delta component is synchronized with an active component of the data object based on the assigned stale LSN. The delta component records write I/O targeted for the base component and, based on detecting the base component becoming available, the base component is synchronized with the delta component.

20 Claims, 8 Drawing Sheets

(56) References Cited

U.S. PATENT DOCUMENTS

| | | | |
|---|---|---|---|
| 2016/0078079 A1* | 3/2016 | Hu .......................... | G06F 16/20 |
| | | | 707/803 |
| 2016/0371020 A1* | 12/2016 | Sarkar ................. | G06F 11/2094 |
| 2017/0147458 A1* | 5/2017 | Epstein ................. | G06F 3/0619 |
| 2017/0255529 A1* | 9/2017 | Kedia ................. | G06F 11/2097 |
| 2017/0277609 A1* | 9/2017 | Slik .................... | G06F 11/2094 |
| 2017/0308437 A1* | 10/2017 | Usvyatsky .......... | G06F 11/1076 |
| 2019/0065092 A1* | 2/2019 | Shah .................... | G06F 3/0689 |
| 2019/0188098 A1* | 6/2019 | Gupta ................. | G06F 11/1446 |
| 2021/0067423 A1* | 3/2021 | Newman ................ | H04L 43/55 |

* cited by examiner

MAINTAINING DURABILITY OF A DATA OBJECT USING UNPLANNED DELTA COMPONENTS DURING TRANSIENT FAILURES

BACKGROUND

Distributed data objects in storage networks can have multiple data components that are placed in different fault domains and/or on different servers. Sometimes, portions of the system in which data objects are stored experience temporary, or transient, failures. Many such storage networks are configured to recover when components become unavailable during such failures, but reconstructing a full component (e.g., performing a full resync) is a resource- and time-consuming process. Even if unavailable components are later restored, the downtime of a component can negatively affect the flexibility of managing other components and/or other data objects in the system and a guarantee of access to data stored in unavailable components is placed in jeopardy.

Further, a temporary loss of one component followed by a permanent loss of another mirrored component results in durability loss of the associated data object. While a temporary or transient failure alone may not be considered urgent enough to merit performance of an expensive full resync process, ensuring that the data stored in the distributed data object is sufficiently protected, such as in situations where a temporary failure is followed by a permanent failure, remains a significant challenge.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for enhancing data durability of a base component of a data object using a delta component during transient fault unavailability is described. A base component of a data object becoming unavailable due to a transient fault is detected. The base component is associated with a stale log sequence number (LSN) indicative of a write input/output message (I/O) that was committed on one or more active components of the data object prior to detection of the base component becoming unavailable. A delta component associated with the base component is generated, wherein the delta component is configured to include unwritten storage space with an address space matching an address space of the base component and a tracking bitmap including a plurality of bits associated with data blocks of the address space of the delta component. The stale LSN with which the base component is associated is assigned to the delta component and the delta component is synchronized with an active component of the data object based on the assigned stale LSN, wherein synchronizing includes updating the address space and the tracking bitmap of the delta component. The delta component then records write I/O targeted for the base component, including updating the tracking bitmap of the delta component and, based on detecting the base component becoming available, the base component is synchronized with the delta component using at least the tracking bitmap of the delta component.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
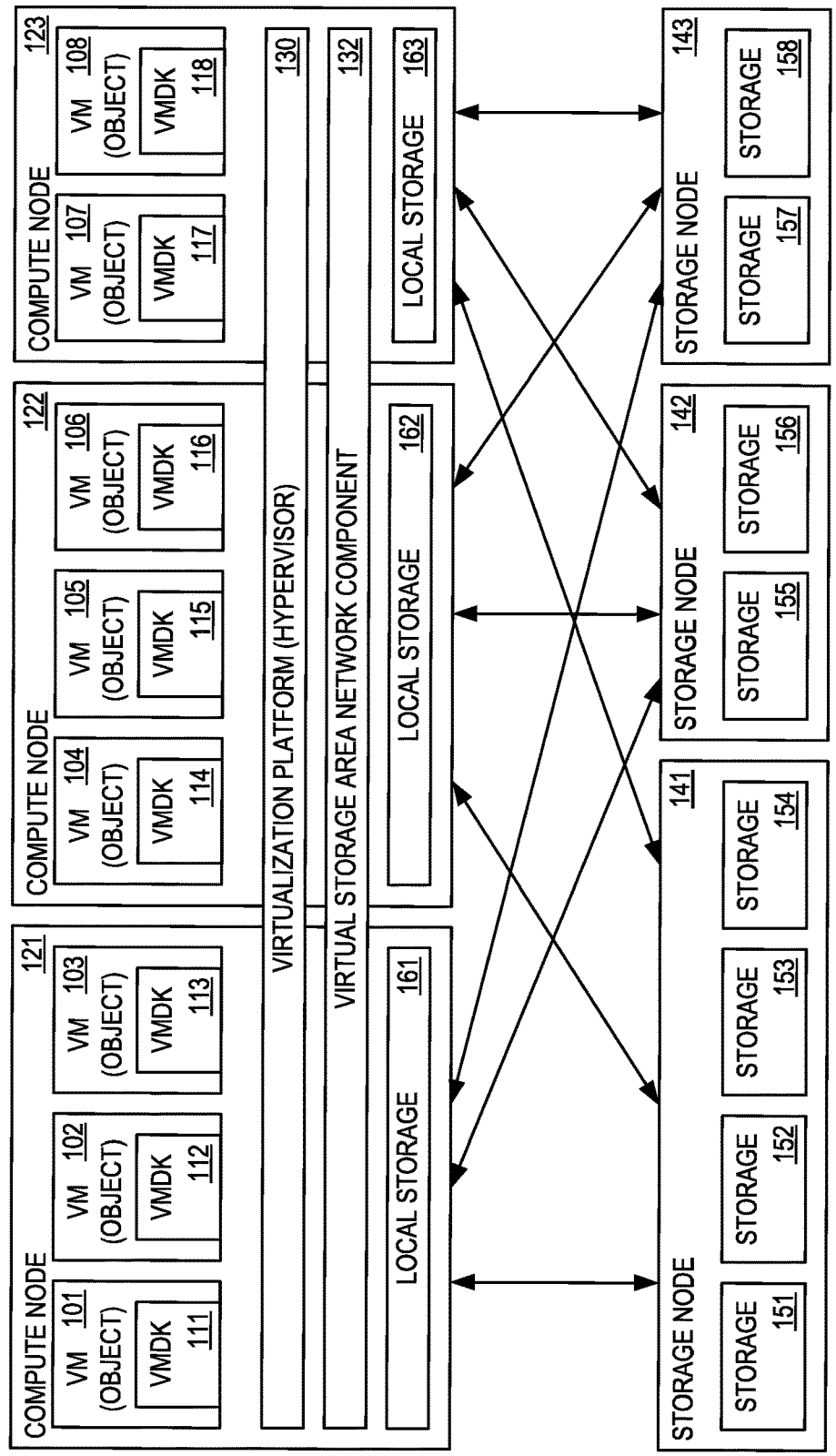
FIG. 1 is a block diagram illustrating a system architecture that is comprised of a set of compute nodes interconnected with each other and a set of storage nodes.

Aspects of the disclosure provide a computerized method and system for maintaining and/or enhancing data durability of a distributed data object using unplanned delta components during transient failure events. When a transient failure of a portion of the storage network occurs, it may cause components of distributed data objects to become temporarily unavailable. During this time period, the data stored in the unavailable components loses at least one level of redundancy or durability and the components may become "stale" if they are unavailable when a write input/output (I/O) would have otherwise changed the data stored therein. When it is detected that a base component is unavailable due to such a failure, an unplanned delta component may be generated in association with the unavailable base component. One purpose of the unplanned delta component is to track and record write I/O traffic that would have otherwise been directed to the base component if it were available. Then, the unplanned delta component is used to synchronize with the base component and bring it up to date when it becomes available again.

After the delta component is generated, it may be "stale" as well, having missed write I/O traffic directed to the base component since the base component became unexpectedly unavailable. Thus, the delta component is synchronized with another active component of the data object, such as a mirrored component of the base component. The synchronization may be based on an indicator of when the base component became unavailable, such as a stale log sequence number (LSN) that is shared from the base component to the delta component. Once the delta component is synchronized, it is activated and begins to record write I/Os directed to the base component, tracking changes made in a tracking bitmap.

When the base component becomes available again, the delta component is used to synchronize with the base component and bring it up to date. Changes made during the downtime of the base component are identified using the tracking bitmap of the delta component and those changes are then copied or otherwise written from data blocks of the delta component to respective data blocks of the base component. After the base component is synchronized and becomes active again, the delta component may be deleted or otherwise removed from the system.

The disclosure operates in an unconventional manner at least by generating the delta component on-demand after the failure of the base component and immediately (in some examples) synchronizing the delta component as necessary to ensure that it has tracked all changes necessary to bring the base component back up to date. Delta components provide several advantages over full component creation, including significantly reduced time and resources to populate the delta component (e.g., the data blocks of the delta component start empty, rather than copying all data from another component to initialize a full component) and reduced or eliminated write amplification when synchronizing with the base component (e.g., the delta component enables synchronization based on only the changed portions of data blocks rather than writing an entire data block to copy during synchronization). The use of delta components as described herein substantially enhances data object durability under a variety of system component failures, such as: disk errors, disk unmount events, network errors, host outages, etc.

Further, the disclosure describes reductions or otherwise improvements to delta component creation latency, including improvements to fault domain placement determination processes. Delta creation and placement processes may be performed in background processes while the active components of the data object continue to process write I/O, which avoids blocking of write I/Os during the downtime of the base component. Additionally, the delta creation processes may be prioritized over other processes to minimize the window of time during which the base component is unavailable and lacks an active delta component. In some examples, fault domain placement processes may be pre-calculated or otherwise performed early based on predicting a transient failure and/or based on a defined time interval. Such pre-calculated fault domain placement information may then be used when generating a delta component based on a detected transient failure, reducing the time required to get the delta component into an active state.

Additional example advantages include saving data storage space by using delta components in place of full components. Delta components may be configured to only require data storage for the changed data of the base component, rather than all data of the base component. Further, in some cases where a transient failure is caused by a very repetitive event, an unplanned delta component may be maintained for multiple downtime periods of a base component, thereby reducing the consumption of time and resources required to generate new delta components for each instance of the repetitive event.

FIG. 1 is a block diagram illustrating a system architecture 100 that is comprised of a set of compute nodes 121-123 interconnected with each other and a set of storage nodes 141-143 according to an embodiment. In other examples, a different number of compute nodes and storage nodes may be used. Each compute node hosts multiple objects, which may be virtual machines (VMs), containers, applications, or any compute entity that can consume storage. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node may host 50, 100, or a different number of objects. Each object uses a virtual machine disk (VMDK), for example VMDKs 111-118 for each of objects 101-108, respectively. Other implementations using different formats are also possible. A virtualization platform 130, which includes hypervisor functionality at one or more of computer nodes 121, 122, and 123, manages objects 101-108.

Figure 8:
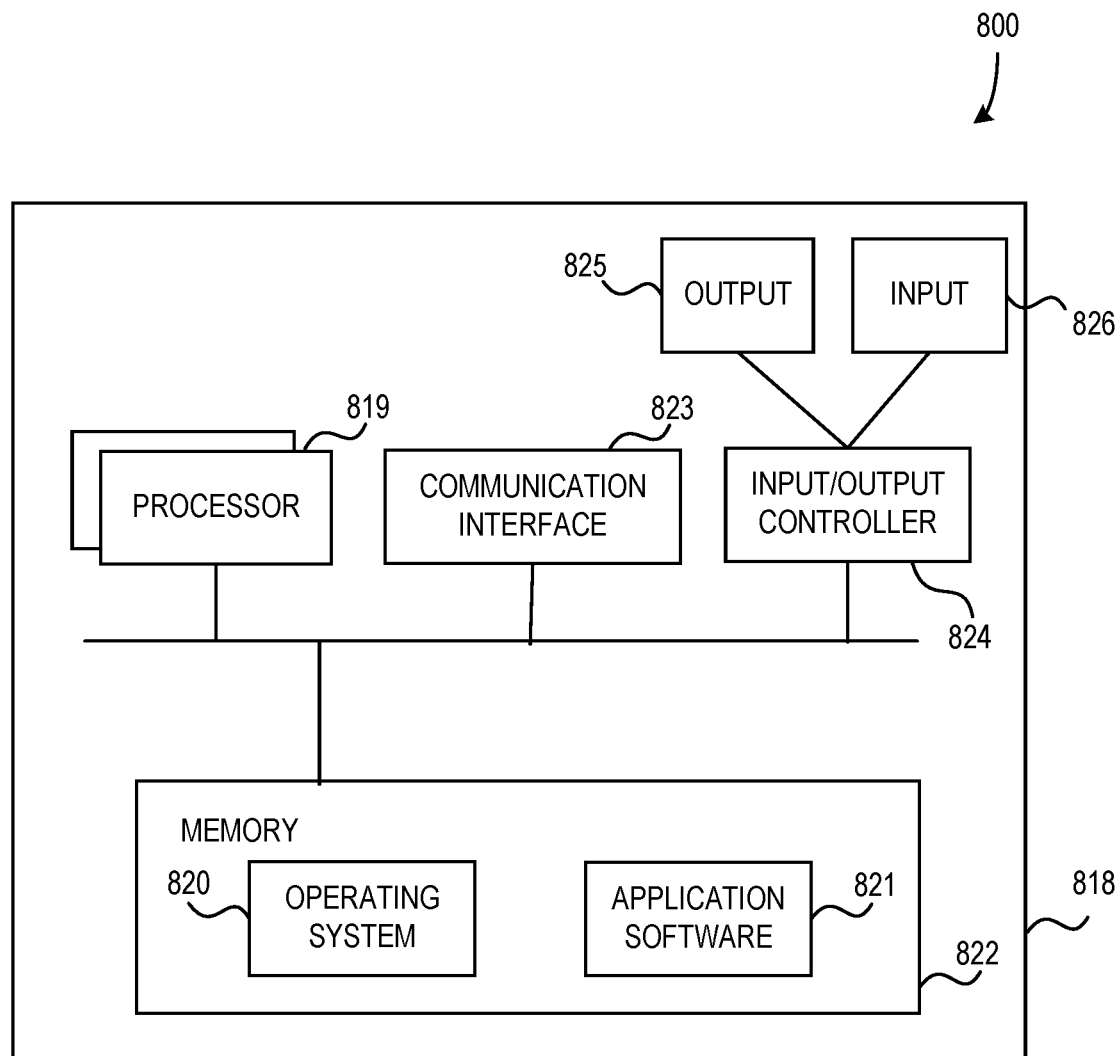
FIG. 8 illustrates an example computing apparatus as a functional block diagram.

In some examples, various components of architecture 100, for example compute nodes 121, 122, and 123, and storage nodes 141, 142, and 143 are implemented using one or more computing apparatuses 818 of FIG. 8.

Virtualization software that provides software-defined storage (SDS), by pooling storage nodes across a cluster, creates a distributed, shared data store, for example a storage area network (SAN). In some distributed arrangements, servers are distinguished as compute nodes (e.g., compute nodes 121, 122, and 123) and storage nodes (e.g., storage nodes 141, 142, and 143). Alternatively, or additionally, some arrangements include servers and/or other nodes that act as both compute nodes and storage nodes. Such an arrangement may be referred to as a hyperconverged infrastructure. Although a storage node may attach a large number of storage devices (e.g., flash, solid state drives (SSDs), non-volatile memory express (NVMe), Persistent Memory (PMEM)) processing power may be limited beyond the ability to handle input/output (I/O) traffic. During data writes to storage devices, a phenomenon termed write amplification may occur, in which more data is written to the physical media than was sent for writing in the I/O. Write amplification is an inefficiency that produces unfavorable I/O delays and may arise as a result of synchronization between mirrored components to bring a stale component up to date, as described herein.

Storage nodes 141-143 each include multiple physical storage components, which may include flash, solid state drives (SSDs), non-volatile memory express (NVMe), persistent memory (PMEM), and quad-level cell (QLC) storage solutions. For example, storage node 141 has storage 151, 152, 152, and 154; storage node 142 has storage 155 and 156; and storage node 143 has storage 157 and 158. In some examples a single storage node may include a different number of physical storage components. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

Thin-provisioning may be used, and in some examples, storage nodes 141-143 do not require significantly more processing power than is needed for handling I/O traffic. This arrangement may be less expensive than in an alternative embodiment in which all of storage nodes 141-143 have the same or similar processing capability as compute node 121. Using the disclosure, compute nodes 121-123 are able to operate with a wide range of storage options, including those with minimal processing capability.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object. Virtual SAN component 132 permits objects 101 and 102 to write incoming data from object 101 and incoming data from object 102 to storage nodes 141, 142, and/or 143, in part, by virtualizing the physical storage components of the storage nodes.

Figure 2:
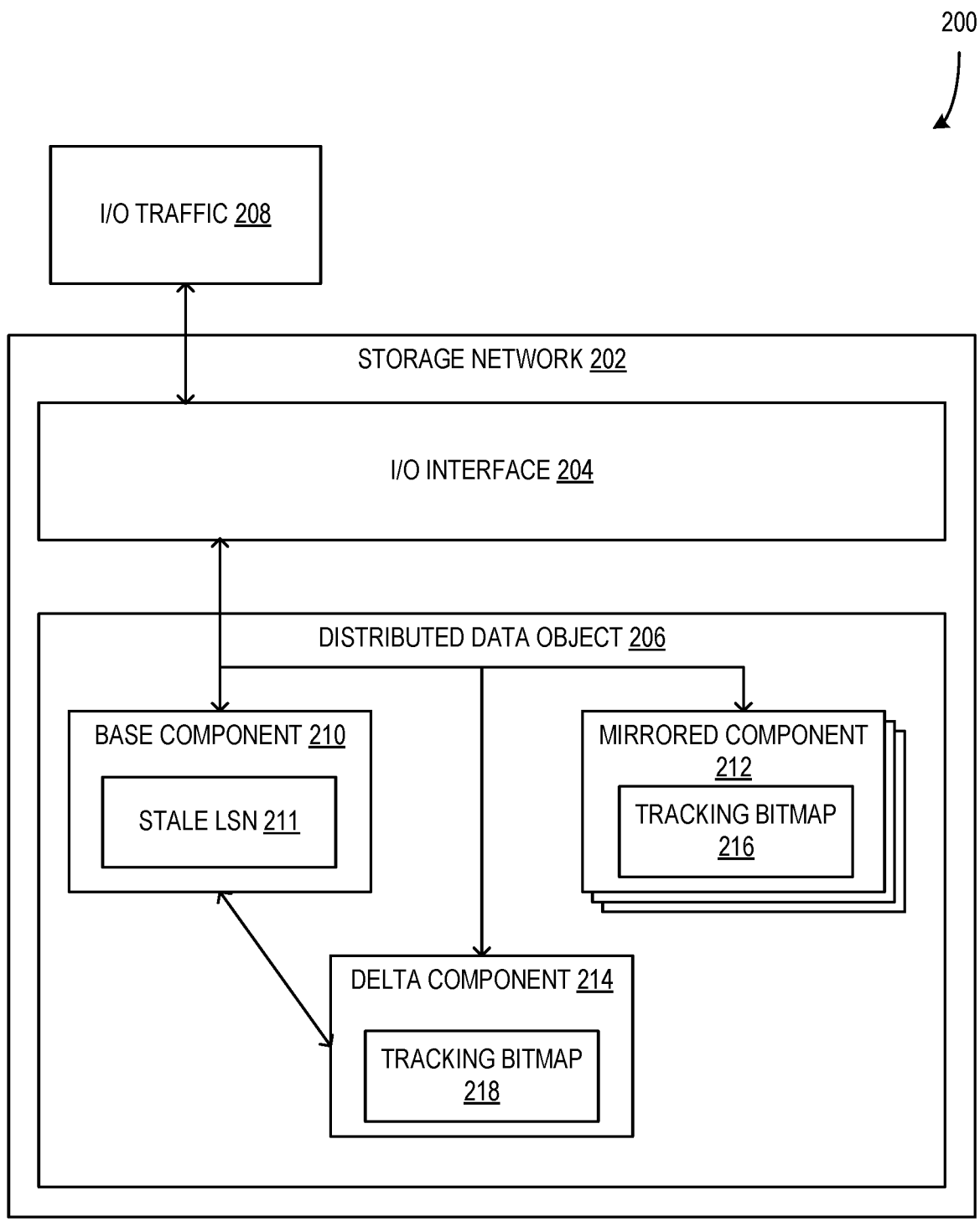
FIG. 2 is a block diagram illustrating a system configured for generation and management of delta components associated with data components of a distributed data object.

FIG. 2 is a block diagram illustrating a system 200 configured for generation and management of delta components 214 associated with data components (e.g., base component 210 and mirrored components 212) of a distributed data object 206 according to an embodiment. In some examples, the system 200 is implemented on a component or components of a system architecture such as system architecture 100 of FIG. 1. For instance, in some examples, the storage network 202 is implemented as a virtual storage network component or virtual SAN component 132 of FIG. 1 as described above.

The storage network 202 includes an I/O interface 204 and a distributed data object 206 and is configured to receive and/or otherwise interact with I/O traffic 208, including I/O messages or instructions for writing data (write I/O or write I/Os) to the distributed data object 206. In other examples, the storage network 202 may include more and/or differently arranged distributed data objects and/or another data storage object or structure without departing from the description. The I/O interface 204 includes hardware, firmware, and/or software configured for receiving I/O traffic 208 from sources outside the storage network 202 and writing or otherwise sending the associated I/O instructions to the distributed data object 206 of the storage network 202. In many examples, the I/O traffic 208 includes instructions to write data to the storage component or components of the distributed data object 206 for storage therein. Additionally, the I/O interface 204 may be configured for retrieving stored data from the distributed data object 206 and provide such retrieved data to sources outside of the storage network 202. Further, the I/O interface 204 may be configured for facilitating communication of data between multiple distributed data objects or other components within the storage network 202 without departing from the description.

The distributed data object 206 is configured to store data across a plurality of data components (data structures configured to store at least a portion of the total data associated with the distributed data object 206), such as the base component 210, the mirrored components 212, and the delta component 214. In some examples, the distributed data object 206 stores data redundantly across multiple components. For instance, multiple copies of a set of data may be stored on each of the base component 210 and the mirrored components 212, such that the data is preserved if one or some of the components fail. The distributed data object 206 may be configured to provide enhanced reliability and availability of the stored data through the redundant storage of data on the multiple components, enabling the data to be accessed despite failure or unavailability of individual components.

While the base component 210 is illustrated separately from the other mirrored components 212, in other examples, the base component 210 is effectively identical to the other mirrored components 212. In more examples, mirrored components may not be a direct identical replica of the base component 210. Rather, if the base component 210 and other components are under an Erasure Coded node, the reconstruction of the mirror of the base will derive from Erasure Coding mathematics, from some or all of the other components apart from the base. Further, the described functionality of the delta component 214 herein may also apply to components of the distributed data object 206 other than the base component 210 in other examples. For instance, a delta component may be generated and used as described herein with respect to the mirrored component 212 such that the mirrored component 212 operates as a base component as described herein.

In some examples, components (e.g., the base component 210) of the distributed data object 206 become unavailable temporarily (e.g., the base component 210 and/or a host device associated therewith experiences some form of transient fault or failure). Because of the previously described redundancy, the distributed data object 206 is typically capable of continuing to provide access to stored data and to receive additional I/O traffic to write data on the mirrored components 212 that remain active. Further, the distributed data object 206 and/or the associated storage network 202 are configured to enhance the reliability and availability of data storage by creating a delta component 214 when the base component 210 upon detecting the base component 210 has become unexpectedly unavailable. The delta component 214 is configured as a temporary component that is configured to log or otherwise track I/O traffic and associated data changes that would be directed to the base component 210 if it were not offline. Further, when the base component 210 becomes reactivated, the delta component 214 is configured to synchronize logged or tracked I/O traffic with the reactivated component such that the base component 210 is brought up to date with respect to I/O traffic that occurred during the period in which it was inactive. The use of the delta component 214 as described provides additional redundancy and reliability of the distributed data object during the downtime of the base component 210.

In some examples, when a host device or entity becomes unavailable due to an unplanned or otherwise unexpected event, such as a transient failure, the components of the host become inaccessible and the availability of the data on the associated distributed data object 206 is reduced or weakened, such that the object is able to tolerate fewer fault domain failures. Further, the components become "stale" due to potentially missing out on I/O traffic during the unavailable period. Stale components (e.g., the base component 210) keep the stale state until they synchronize with an active mirrored component or delta component. If there is no available component for synchronizing, stale objects are never able to restore data availability. For example, if the host of the base component 210 becomes unavailable for a period of time and the base component 210 is unavailable during incoming I/O traffic 208, when the base component 210 is reactivated, it is considered "stale", in that it has not been updated to include the incoming I/O traffic 208 that occurred during the downtime. If the delta component 214 is not generated and operated as described herein and there are no mirrored components 212 that are active and available for synchronizing, the base component 210 and the associated distributed data object 206 will lose data availability forever.

Rather, upon detecting that the base component 210 has become unavailable due to a detected yet unplanned event, the delta component 214 is generated to track incoming I/O traffic 208 during the downtime and to provide a source for synchronizing when the base component 210 is reactivated. In some examples, the incoming I/O traffic 208 is also written to the mirrored components 212, but the delta component 214 provides an additional resource for protecting the availability of the data during the downtime by providing "eventual data availability" (e.g., other mirrored components 212 may experience failure or inactivity during the downtime or otherwise prior to the base component 210 synchronizing to come back up to date).

The delta component 214 is configured to store the latest data of the data blocks affected by the I/O traffic 208 that is not captured by the deactivated base component 210. The base component 210 can then be brought up to date by synchronizing with the delta component 214 before the delta component 214 is deleted or otherwise removed.

In some examples, the delta component 214 is not a full copy of the base component 210. Instead, the delta component 214 is configured to include the address space of the base component 210, but the data locations are unwritten, rather than written with copied data from the base component 210. As a result, the delta component 214 does not alone provide full data availability as might be provided by an active mirrored component 212. However, because the delta component 214 tracks incoming I/O during the inactive period of the base component 210, the delta component 214 does enable full data availability to be eventually provided by the base component 210 after synchronizing. Thus, the delta component 214 provides "eventual data availability".

In some examples, unplanned, transient, and/or spontaneous failures of components of a data object (e.g., base component 210 of the data object 206) include events such as a host device power outage, disk downtime, network errors, or the like. Such failures may be described as "transient" in that the component recovers from the failure sooner rather than later. In some examples, if such a failure does not resolve, the use of delta components as described herein may not increase the chance of availability of the failed component. Further, the described systems may be configured to refrain from using delta components as described herein if it is determined that the failed component will not recover from the failure.

Additionally, there may be some extremely common types of transient failures, including back-and-forth disconnect events, connection of reliable data transfer (RDT) events, or the like. The described system may be configured to determine whether to use delta components as described herein. For instance, if delta components are used for repetitive events from RDT, this may result in a waste of resources for transient failures that occur very frequently. The described system may be configured to identify failure events that are very frequent and refrain from using delta components when those are detected. Alternatively, in some examples, the system may be configured to create and maintain a delta component to handle more than one of such frequent transient failures to avoid committing resources to creating and deleting multiple delta components frequently.

The delta component 214 creation involves claiming a fault domain that can be exclusive of the existing components' respective fault domains. Further rules may also be used to determine the fault domain placement, depending on, for instance, the object Redundant Array of Independent Disks (RAID) configuration. Thus, in some instances, the creation may fail due to scarcity of resources in the cluster. However, the system 200 may be configured to retry the creation over the course of a time period and/or based on a quantity of write I/Os missed by the failed or unavailable base component 210. If a delta component 214 is not created prior to the expiration of the defined time period and/or a large enough quantity of missed write I/Os occur, the system may stop retrying to create the delta component 214. In such cases, other processes may be initiated to protect the data of the data object 206 without departing from the description.

In some examples, any failure causing an I/O path to lose service availability results in a determination of whether to create a delta component in response. Such failures may include fault domain events such as host failures, disk group failures, or individual disk failures as well as other factors such as "slowness failures" based on slowed performance of software or hardware. Such slowness failures may be divided into two categories: network slowness failures (e.g., at the RDT level, the network interface controller (NIC) level, and/or the infra level) and non-network slowness failures (e.g., log structured object management (LSOM) congestion or slowness). The non-network slowness failures may be excluded from the set of unplanned failures that trigger the use of a delta component as described herein. A suite of criteria may be defined to identify failures that trigger delta component creation with the fewest false positives and with some capability of predicting a near-future failure.

In some examples, I/O failures due to transient infra-level failures are first observed by watch dogs or stuck I/O iterators and they usually manifest as slow I/Os. Predicting or otherwise detecting such failures early and accurately may greatly relieve the cluster level object manager (CLOM) from receiving failure events in discrete batches of many failures. Further, such prediction or early detection may buy time by distributing reconfiguration operations over a relatively longer time than creating a large backlog for CLOM.

Different failure types may be detected by different software components of the described systems. Below is a table of failure types that may trigger delta creation.

TABLE 1

| Category | Error Type | Unplanned Delta Trigger? | Causes Absence of Component? |
|---|---|---|---|
| LSOM | Congestion | No | No |
| LSOM | Slowness | No | No |
| RDT | Disconnect | Yes | Yes |
| NODE | Node Decom | Yes | Yes |
| DISK | Disk Decom | No | No |
| DISK | SSD Error | Yes | Yes |
| DISK | MD Error | Yes | Yes |
| DISK | Remote No Space | No | Yes (remote site) |

The two LSOM category errors of Table 1 are non-network errors and, as a result, they do not trigger the use of unplanned delta components for the reasons mentioned above. The RDT Disconnect error and NODE Decommissioning error do trigger the use of an unplanned delta component and they cause the absence of the component. However, at the DISK level, a disk decommissioning error does not trigger the use of an unplanned delta component. Both SSD (Solid State Disk) and MD (Magnetic Disk) errors in the DISK category trigger the use of a delta component, while a "Remote No Space" type error in the DISK category does not trigger the use of a delta component. In other examples, more, fewer, or different types of errors may trigger the use of an unplanned delta component without departing from the description herein.

In some examples, an object manager of the system 200 (e.g., a CLOM) is configured to create delta components as soon as possible to minimize the window of time in which write I/Os targeted to the unavailable base component are missed by the associated delta component (e.g., the time during which the base component is unprotected). For instance, such an object manager may be configured to create and configure delta components in under 10 milliseconds (ms) per delta component placement work item (e.g., a process by which the object manager determines where to place a new delta component in fault domains of the system). In such examples, if a single host's 9,000 components become absent at the same time, there may be up to 90 seconds of unguaranteed durability for successfully created deltas. The object manager may further be configured to optimize the process using a cached priority order by which components had the latest write I/O.

A CLOM or other object manager of the system 200 may be configured to put the creation/placement of a delta component 214 at a higher priority than other processes to minimize the time spent with an unprotected base component 210. After a delta component is created, it must be synchronized with any write I/Os that were missed between the failure of the base component 210 and the activation of the delta component 214. This means that the delay in the placement of the delta component 214 by the object manager is proportional to the delay required to synchronize the delta component 214 before activation. As a result, the processes associated with the synchronization of the delta component 214 may also be placed at a higher priority than other similar processes (e.g., each host of a system may be configured with a set quantity of process slots dedicated to performing unplanned delta processes of placement and/or synchronization).

Further, in some examples, the creation and/or configuration of a delta component may be performed by a hierarchy of object managers (e.g., a CLOM, a distributed object manager (DOM), and/or an LSOM) and communication between object managers may incur network latency and/or disk slowness. Such issues may be addressed by raising the priority or weight of delta creation I/O and/or resynchronization I/O on one or more of the object managers of such a hierarchy.

In some examples, a CLOM or other object manager of the system 200 is configured to prepare the placement of delta components based on any detected potential slowness of many I/Os around the same interval (e.g., from LSOM or from network delays). The CLOM may be configured to receive alerts (e.g., from a DOM) and to prepare placement of delta components in advance. Within the timeout intervals of the I/Os, the placement decisions may still be valid and usable for creation and configuration of a delta component (e.g., by the DOM).

In some examples, fault domains are divisions of the system that represent components being disposed on different physical host devices, such that the availability of the distributed data object is protected against failure of one or more host devices of the plurality of host devices, increasing data durability. For instance, a base component and mirrored component may be located in different fault domains such that failure of hardware in one fault domain does not cause a failure of a mirrored component on a different fault domain. Additionally, or alternatively, fault domains of the system may include other components, such as witness components, data components that are unrelated to the distributed data object, and/or unused fault domains.

Selecting a fault domain for a delta component may include determining a fault domain placement among a set of possible fault domains. The system may be configured to prioritize certain types of fault domains to efficiently use fault domain resources and preserve the durability of the data of the data object. For instance, the fault domain on which the base component 210 is located will not be selected as the fault domain for the delta component 214 since the delta component is configured to complement the base component 210. Further, the delta component 214 should not be placed on the same fault domain as a mirrored component 212 for the same reason. Other fault domains, such as fault domains with witness components, fault domains with unrelated components, and/or unused fault domains may be selected for placement of the delta component based on defined delta component placement rules (e.g., rules prioritizing certain types of fault domains or rules requiring fault domains with available resources above a threshold). Further, unused fault domains may be lower priority than other possible fault domains to preserve the availability of unused fault domains for future operations if possible.

The CLOM may be configured to pre-calculate and cache a delta component placement when no major component count changes, no major space changes, and the specific object has not been reconfigured since the last placement. Such pre-calculation may be performed by the CLOM for all components' potential absence. The scale of the cached placement data may be linearly proportional to that of the number of components in the cluster and the average object policy size. New configurations may be compressed to differential versions with only delta-related information inside recording the delta's companion component, the base component universally unique identifier (UUID), the disk UUID, such that a total of only 16 bytes per object is used. The CLOM may do a pre-fetch of the calculation based on an interval, where the interval is defined to be long enough to lessen on-demand CLOM workload and short enough to prepare for any imminent transient failures.

The mirrored components 212 and delta component 214 are configured to include tracking bitmaps 216 and tracking bitmap 218, respectively. The tracking bitmaps 216 and 218 are used by the associated components to track data blocks that are changed due to incoming I/O traffic 208 during downtime of the base component 210. By tracking which data blocks are changed during the downtime, the base component 210 can be brought up to date by synchronizing only those changed data blocks as indicated in the tracking bitmaps 216 and 218. In some examples, the tracking bitmaps 216 and 218 are configured to include a plurality of data bits with each data bit mapping to an individual data block within the address space of the component. The data bits of the tracking bitmap may be initialized to '0' and, upon incoming I/O traffic 208 causing data in a data block to change, the associated component updates the mapped data bit of the data block to be a '1', indicating that that data block will need to be provided to the base component 210 in order to bring it up-to-date, once the base component 210 is available again. The use of tracking bitmaps 216 and 218 are described in greater detail below with respect to FIG. 4. In other examples, changes to the data blocks of the base component 210 may be tracked in other ways without departing from the description (e.g., centralized tracking bitmaps that are not specifically associated with components, etc.).

Because the delta component 214 does not need to have the historical written I/O of the object before creation or generation, the delta component 214 is configured to become active rapidly after creation. Delta component 214 has three major states (the persistent state and the memory state of these three are same) in some examples. Once created and synchronized successfully, delta component 214 will go to active state. If delta component 214 is disconnected from the owning distributed data object, delta component 214 transitions into an absent state. In some examples, a system management program is configured to immediately mark the absent component as a degraded component to mark it for removal by an associated cleanup process. Alternatively, the system may be configured to monitor delta component 214 and, upon it reconnecting to the owning distributed data object, it may be resynchronized using an active component of that data object, such that it becomes an active delta component again.

In some examples, it may take more than an hour for the cleanup process to clean up an absent component. However, it is not necessary to leave an inactive delta component to wait for such a time window, because once the base component 210 is synchronized, the purpose of the delta component 214 is completed and the component 214 will become stale if/when new I/O traffic is committed to another active mirrored component. To avoid letting a degraded delta component 214 wait for removal and occupy system resources while waiting, the degraded delta component 214 may be deleted quickly by moving it to the degraded state and notifying the cleanup process to delete it as soon as possible. In alternative examples, the degraded delta component 214 may be promoted back to active if it has not become stale and its disk is healthy.

In some examples, the tracking bitmap 216 of the mirrored component 212 is created and/or starts tracking I/O traffic based upon detecting that the base component 210 has become unavailable. The time at which the base component 210 becomes unavailable is associated with a stale log sequence number, or stale LSN 211. The stale LSN 211 is the LSN of the write I/O that is the last write I/O committed on all active mirrored components prior to the detection of the unavailability of the base component 210. Tracking bitmap 216 may be established to track all write I/Os that occur after the stale LSN 211, such that the tracking bitmap 216 can be used to efficiently resynchronize the base component 210 when it becomes available.

When the delta component 214 is created, the stale LSN 211 of the unavailable base component 210 may be shared to the delta component 214 for use with the tracking bitmap 218. Because the delta component 214 may have missed some write I/Os between the failure of the base component 210 (and the stale LSN 211) and the activation of the delta component 214, the system 200 may be configured to synchronize the delta component 214 and tracking bitmap 218 with an active mirrored component 212 and an associated tracking bitmap 216 based on the stale LSN 211 shared to the delta component 214. Specifically, the system 200 may use the stale LSN 211 to identify an associated tracking bitmap 216 of an active mirrored component 212 to use for the synchronization process because each tracking bitmap of each mirrored component may be associated with a specific stale LSN.

Figure 3:
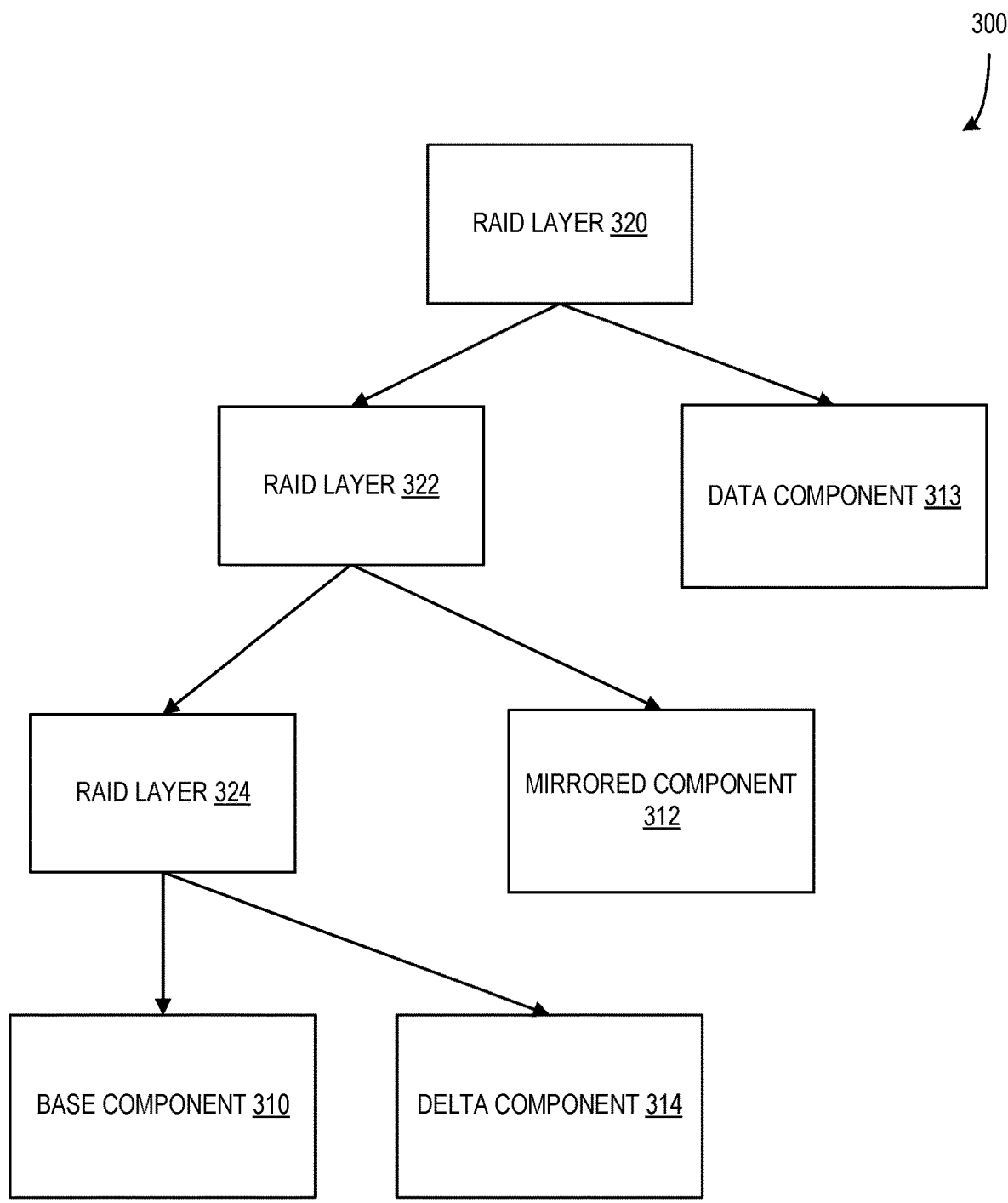
FIG. 3 is a block diagram illustrating a system configured with a redundant array of independent disks (RAID) for use with delta components.

FIG. 3 is a block diagram illustrating a system 300 configured with a redundant array of independent disks (RAID) (e.g., RAID layers 320, 322, and 324) for use with delta components (e.g., delta component 314) according to an embodiment. In some examples, the system 300 is implemented by a component or components of a system such as system 100 of FIG. 1 and/or system 200 of FIG. 2 (e.g., the distributed data object 206 may include the RAID system 300). The RAID layers 320 and 322 may include layers configured for mirroring (e.g., RAID 1) the associated components (e.g., mirroring the mirrored component 312 and the components associated with the RAID layer 324). Additionally, or alternatively, the RAID layers 320 and 322 may include layers configured for "striping" (e.g., RAID 0), such that the components associated with such a layer share data storage associated with incoming I/O traffic. For instance, if RAID layer 320 is configured as a RAID 0 layer, data stored may be split between the component 313 and the components associated with RAID layer 322. The RAID layers 320 and 322 may be configured to combine both types, such that RAID layer 320 is configured for striping and RAID layer 322 is configured for mirroring (e.g., RAID 01), or vice versa (e.g., RAID 10). Further, the RAID layers 320, 322, and/or 324 may be configured with other RAID features or functionality without departing from the description herein (e.g., error correction of a RAID 2 configuration or various parity features of RAID 3, 4, 5, and/or 6 configurations). Additionally, or alternatively, the RAID layers may be configured with erasure coding (e.g., RAID 5 or 6 configurations) without departing from the description.

To enable the functionality of the delta component 314 as described herein, in some examples, the RAID layer 324 is configured for mirroring I/O traffic intended for the base component 310 between the base component 310 and the delta component 314. Thus, the configuration of the RAID layer 324 may be configured for mirroring independently from the overall arrangement of the RAID system 300. It should further be understood that, in other examples, the RAID system 300 may be organized in other arrangements and/or include more, fewer, or different RAID layers and associated components without departing from the description herein.

In some examples, the components "vote" when determining whether to commit or abort a write I/O to the associated distributed data object. The components vote to commit if they are in a state in which they can commit the write I/O. If the components as a group submit a threshold quantity of votes to commit the data, the data is committed to the distributed data object and the associated components. Alternatively, if the components do not submit a threshold quantity of votes to commit (e.g., several of the components are in an unavailable or failed state), the write I/O command is aborted for the distributed data object. As a result of aborting the command, a notification or alert may be sent to the source of the write I/O. In some examples, the voting process is handled according to a two-phase commit (2PC) configuration. The delta component as described herein has the same vote weight in such a process to decide whether I/O should be committed or aborted. Further, the algorithm to handle 2PC I/O failure recovery on the delta component will be same as that for the mirrored components under a RAID 1 or RAID erasure coding (EC) configuration. All relevant active delta components' votes are counted when calculating the "needed count" and "actual count" for an inflight I/O.

Further, it should be understood that, in configurations using RAID EC where conventional mirrored components of an object do not necessarily have the exact same data stored due to such a configuration, the use of the delta component to synchronize with the base component as described herein is a substantial improvement over synchronizing with the other mirrored components, as synchronizing with the other mirrored components requires a reconstruction of data from each component to obtain the data needed to write to the synchronizing base component.

Figure 4:
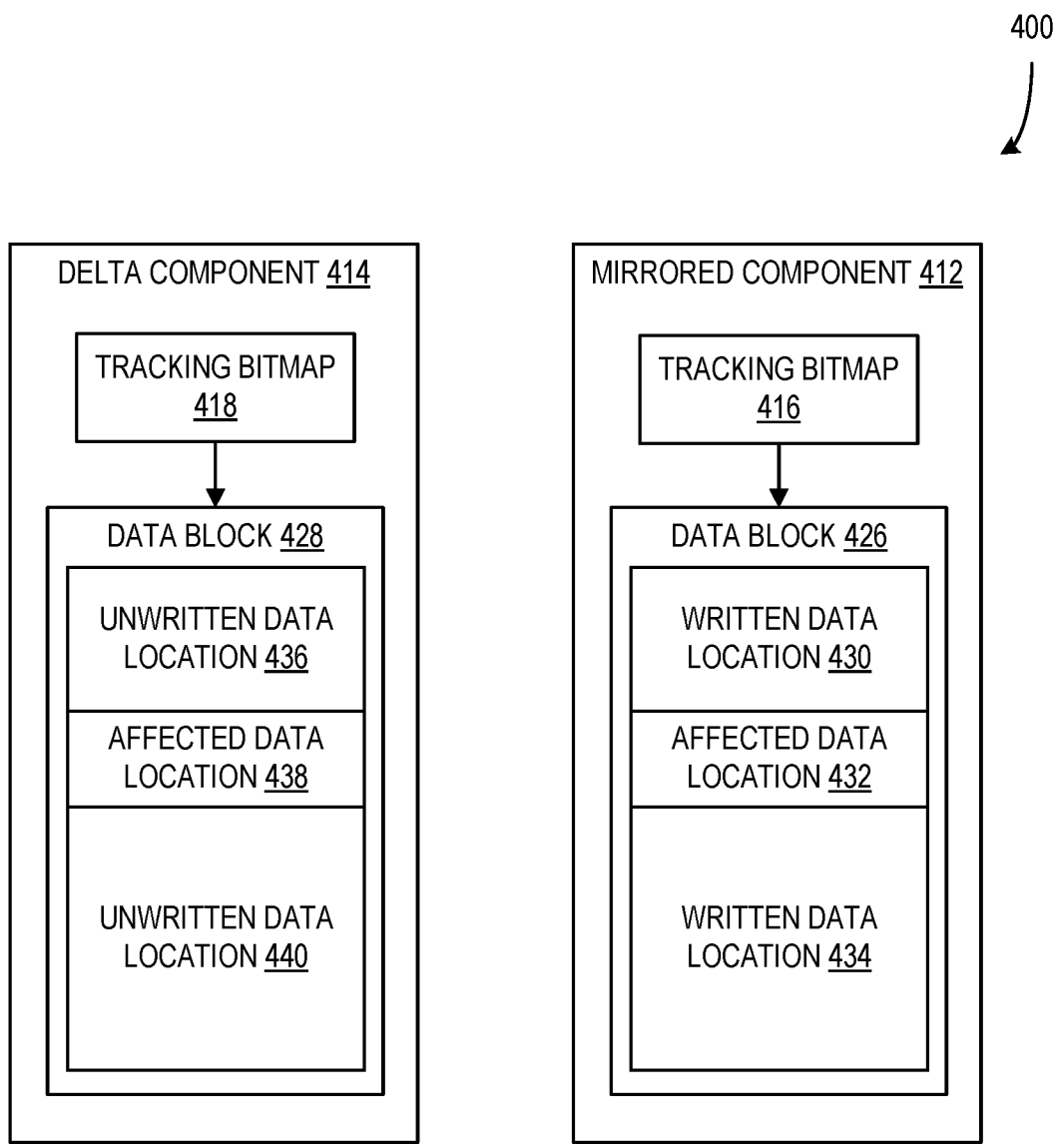
FIG. 4 is a block diagram illustrating tracking bitmaps of a delta component and a mirrored component and associated data blocks.

FIG. 4 is a block diagram 400 illustrating tracking bitmaps 418 and 416 of a delta component 414 and a mirrored component 412 and associated data blocks 428 and 426 according to an embodiment. In some examples, the delta component 414 and the mirrored component 412 are included in a system such as system 200 of FIG. 2 as described herein. Further, it should be understood that the delta component 414 and the mirrored component 412 are configured to mirror the same component (e.g., base component 210) during a period when the component being mirrored is inactive, such that the tracking bitmaps 418 and 416 are used to track incoming I/O traffic for use in synchronizing with the component when it is reactivated.

The tracking bitmaps 418 and 416 each include references to data blocks 428 and 426, respectively. As previously described, the tracking bitmaps include bits that are associated with specific data blocks of storage space and those bits are changed in the tracking bitmaps when the associated data blocks are changed due to incoming I/O. As illustrated, the data blocks 428 and 426 are data blocks that include "affected" data locations 438 and 432 respectively, which are data locations that have been changed due to incoming I/O during the downtime of the component that is being mirrored. The data of the affected data locations 438 and 432 will need to be provided to the inactive component in order to bring it up to date after the downtime is over. Because both the delta component 414 and the mirrored component 412 are configured to mirror the inactive component, the data written to the affected data locations 438 and 432 is substantially identical.

However, the delta component 414 is not an exact copy of the inactive component or the mirrored component 412 and, as a result, the data locations of the data blocks of the delta component 414 comprise primarily unwritten data locations. For instance, the data block 428 includes unwritten data locations 436 and 440 in addition to the affected data location 438. In some examples, the unwritten data locations 436 and 440 are identifiable as "unwritten" in that they have been initialized (e.g., set to '0') or otherwise assigned values indicating the locations are unwritten. By comparison, the mirrored component 412 is a full copy of the inactive component that is configured to mirror all of the data locations of the inactive component such that the data block 426 includes the affected data location 432 and also written data locations 430 and 434. The data block 426, and potentially many other data blocks of the mirrored component 412, include data written to the mirrored component 412 prior to the downtime of the inactive component and, as a result, the data block 426 may already be populated with data when the mirrored component 412 begins tracking I/O traffic during the downtime of the inactive component.

As a result of this difference, when bringing the inactive base component back up to date by synchronizing, using the delta component 414 may substantially reduce the occurrence of write amplification when copying affected data of data blocks to the recently activated base component when compared with the synchronization process using the mirrored component 412. For instance, because the data block 428 includes substantial unwritten sections, the synchronization process is able to identify the affected data location 438 specifically and limit the copying of data to just the affected data location 438 rather than copying the entire data block 428. Alternatively, because the data block 426 of the mirrored component 412 includes both the affected data location 432 and other written data locations 430 and 434, the system is not capable of identifying which locations of the data block 426 need to be copied. As a result, synchronizing the base component with the mirrored component 412 requires the copying of the entire data block 426 to ensure that the base component is brought up to date. Thus, the written data locations 430 and 434 of the data block 426 must be copied to the equivalent locations within the base component, even though those equivalent locations already contain the written data, causing write amplification.

The process of synchronizing a base component with a delta component 414 includes the four operations: estimating the synchronization workload using the tracking bitmap, reconciling the base component (e.g., resolving unresolved I/O), filtering out unwritten portions of the workload, and copying the data of the workload. In examples where the delta component 414 is present, there are two types of sources for three of the above four operations to synchronize the base component: the mirrored component 412 and the delta component 414. There are several possible ways to make use of the two types of synchronization sources.

First, the system may be configured to only use the regular mirror components. This is the same process as synchronizing a base component when a delta component 414 is not present. The performance of such a process remains the same as that of a typical synchronization without a delta component 414, and the delta component 414 is only used when the distributed data object (e.g., the mirrored components 412) does not otherwise have data availability. The drawback is that the process does not take advantage of the delta component 414 to get the best performance as described herein.

Second, the system may be configured to use mixed mirror sources (e.g., the mirrored component 412 and the delta component 414). In this approach, the synchronization engine can pick up any sources (including regular mirrored components and delta components) for relevant operations as long as they are available, and the synchronization workflow will continue so long as at least one source remains available. This process may give the best performance, but is configured to handle mismatches when synchronization sources are mixed. The process can use the delta component 414 to get written data blocks and data locations and read data by default, but if the delta component 414 becomes unavailable, the process tracks the type of synchronization source used up to that point and ensures that the correct data is copied from the synchronization source. For instance, if using the delta component 414, the unwritten data locations may be filtered out prior to copying as described herein, but if the process switches to using a mirrored component 412 prior to completion of the synchronization, the process also changes to fully copying the affected data blocks of the mirrored component 412 to complete the synchronization process. Additionally, this process presents challenges with respect to managing issues that may be related to either the delta components or the mirrored components.

Third, the system may be configured to use a fixed mirror source for each synchronization process and to prioritize the use of delta components 414 if they are available. In this configuration, if the source of the synchronization process becomes unavailable during the process, the system is configured to restart the process using another available source rather than attempting to continue the process with a different source. In most cases, this configuration takes advantage of the described advantages of the delta component 414 due to prioritizing it over other mirrored components 412. In some situations, when the delta component 414 becomes unavailable prior to completion of the synchronization, the process may be restarted using a mirrored component 412, which substantially increases the time and resource cost of the process.

Figure 5:
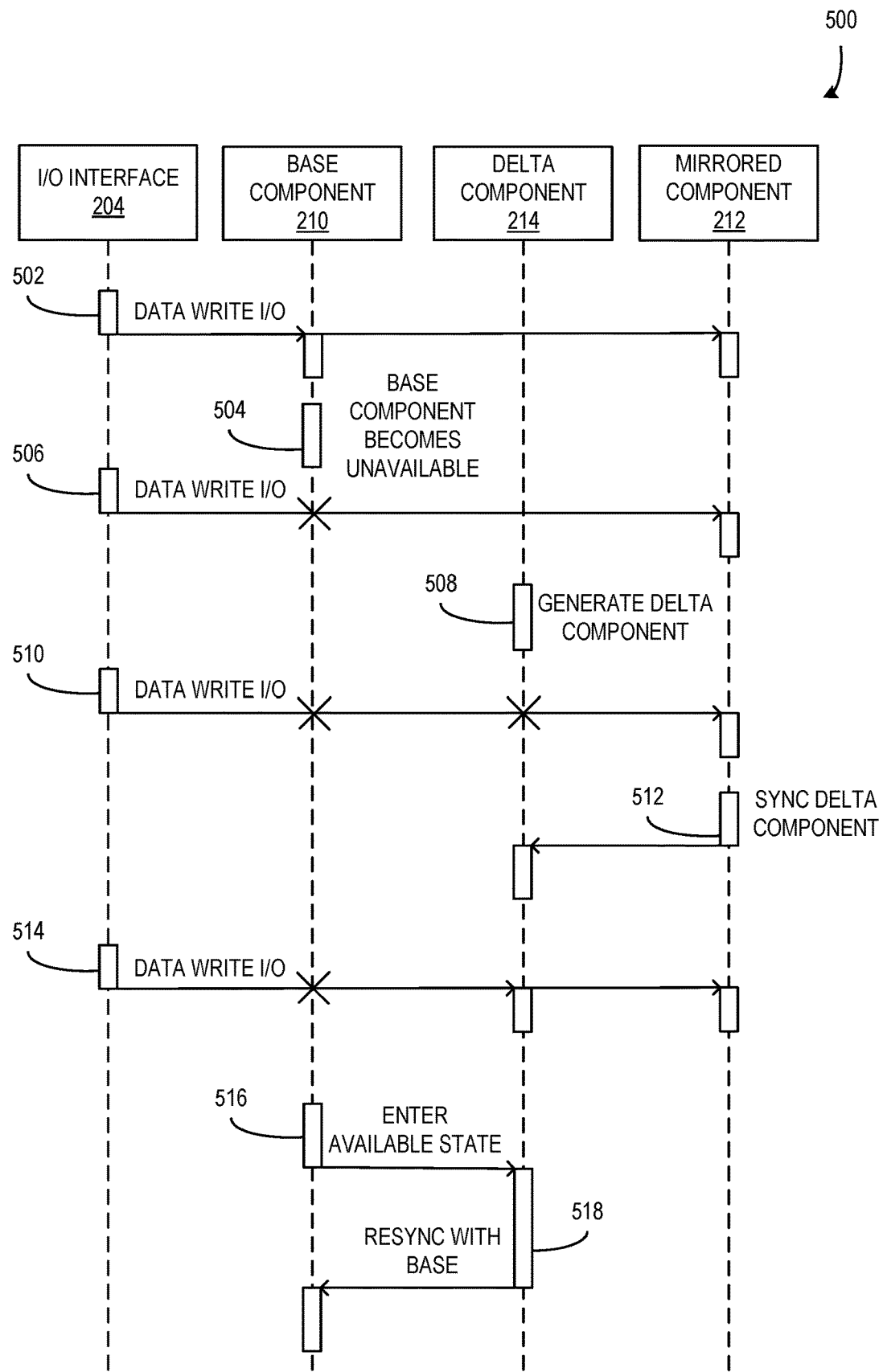
FIG. 5 is a sequence diagram illustrating a process of generating a delta component based on an associated base component becoming unavailable due to a transient failure and synchronizing the associated base component from the delta component.

FIG. 5 is a sequence diagram illustrating a process 500 of generating a delta component 214 based on an associated base component 210 becoming unavailable due to a transient failure and synchronizing the associated base component 210 from the delta component 214 according to an embodiment. In some examples, the process 500 is performed by a component or components of a system such as system 200 of FIG. 2 as described herein. At 502, data write I/O is provided to the active base component 210 and an associated mirrored component 212 from the I/O interface 204. In some examples, the process 500 includes multiple data write I/O messages to the base component 210 prior to the process 500 proceeding to 504.

At 504, the base component 210 becomes available due to a transient failure. For instance, the transient failure may include events such as a host device power outage, disk downtime, network errors, or the like. The system may detect the failure of the base component 210 and record a stale LSN associated with the failure as described herein. Further, system may cause the mirrored component 212 to create a tracking bitmap associated with the stale LSN of the base component 210 such that the mirrored component 212 tracks changes made to data during the downtime of the base component 210.

At 506, data write I/O is provided to the associated mirrored component 212 from the I/O interface 204. Because the base component 210 is unavailable, it does not receive the data write I/O at 506. In some examples, the mirrored component 212 is configured to update the tracking bitmap to reflect the data write I/O, such that changes made can be synchronized with the base component 210 and delta component 214 as described herein.

At 508, a delta component 214 is generated as a result of the base component 210 becoming unavailable. The process of detecting the failure of the base component 210 and then generating the delta component 214 takes some amount of time, such that the data write I/O at 506 is received prior to the delta component 214 becoming active. The system may be configured to minimize the time required for the delta component generation 214 process as described. In some examples, generating the delta component 214 includes generating a tracking bitmap with which the delta component 214 is configured to track changes to the data address space due to data write I/O during the downtime of the base component. The delta component 214 is configured to comprise unwritten data blocks and to mirror changes targeted at the base component 210 after its generation. Further, the generated delta component 214 and the associated tracking bitmap may be associated with the stale LSN of the base component 210.

At 510, data write I/O is provided to the associated mirrored component 212 from the I/O interface 204. Because the base component 210 is unavailable and the delta component 214 has been generated but not synchronized and activated, the components 210 and 214 do not receive the data write I/O at 510. In some examples, the mirrored component 212 is configured to update the tracking bitmap to reflect the data write I/O, such that changes made can be synchronized with the base component 210 and/or the delta component 214 as described herein.

At 512, the delta component is synchronized with the mirrored component 212 (e.g., including changes associated with data write I/Os at 506 and 510). In some examples, the synchronization includes assigning the stale LSN of the base component 210 to the delta component 214, such that the components 210 and 214 share a stale LSN. That shared stale LSN is used to identify a tracking bitmap of the mirrored component 212 (e.g., a tracking bitmap associated with the stale LSN or that otherwise includes tracking data that tracks write I/O traffic starting with write I/Os immediately after the stale LSN). The identified tracking bitmap of the mirrored component 212 is then used to synchronize the delta component 214 with the mirrored component 212, such that data blocks and the tracking bitmap of the delta component 214 include and track changes made by I/O traffic targeted at the base component 210 after the time indicated by the stale LSN. Once the synchronization of the delta component 214 is complete, the delta component 214 is considered active and ready to receive write I/Os targeted at or otherwise intended for the base component 210.

At 514, data write I/O targeted at the base component 210 and the mirrored component 212 is provided to the mirrored component 212 and the delta component 214 from the I/O interface 204. Because the base component 210 is unavailable, it does not receive the data write I/O at 512. In some examples, the mirrored component 212 and the delta component 214 are configured to update respective tracking bitmaps to reflect the data write I/O, such that changes made can be synchronized with the base component 210 as described herein.

At 516, the base component 210 enters an available state (e.g., the base component 210 recovers from the transient failure). In some examples, the host device of the base component 210 comes back online from a failure, enabling the base component 210 to become available and begin receiving data write I/O's and storing data based thereon. Because some data write I/O has been received that was intended for the base component 210 while the base component 210 was unavailable, the base component 210 is considered "stale". As a result, it must be synchronized with an active mirror, which is the delta component 214 in this case. In other examples, other mirrored components 212 may also be available as synchronization sources for the base component 210, as described herein.

At 518, the delta component 214 synchronizes with the base component 210 to bring the base component 210 up to date. In some examples, the synchronization process includes identifying data blocks with changes that have been tracked by the delta component 214 using a tracking bitmap and copying changes to those data blocks to the equivalent data blocks of the base component 210 as described herein.

In some examples, the delta component is created in the background as write I/Os (e.g., at 506 and 512) are processed while the base is unavailable. As long as the object is still alive, the other active components (e.g., mirrored component 212) still have the ability to tell which I/Os are written after the base is unavailable. Chronologically, delta creation is guaranteed to happen after the base becomes unavailable. Thus, the delta component 214 misses write I/Os that are only, and must be, included in the write I/Os missed by the base. This is to say that the base component's missed write I/Os subsumes the delta component's missed write I/Os. Tracking of those missed write I/Os could be explicit with some data structure recording the write locations (e.g., tracking bitmaps) after the absence event using the base component's stale LSN, or implicitly by writing every write I/O's LSN on-disk and later querying them in batches.

Figure 6:
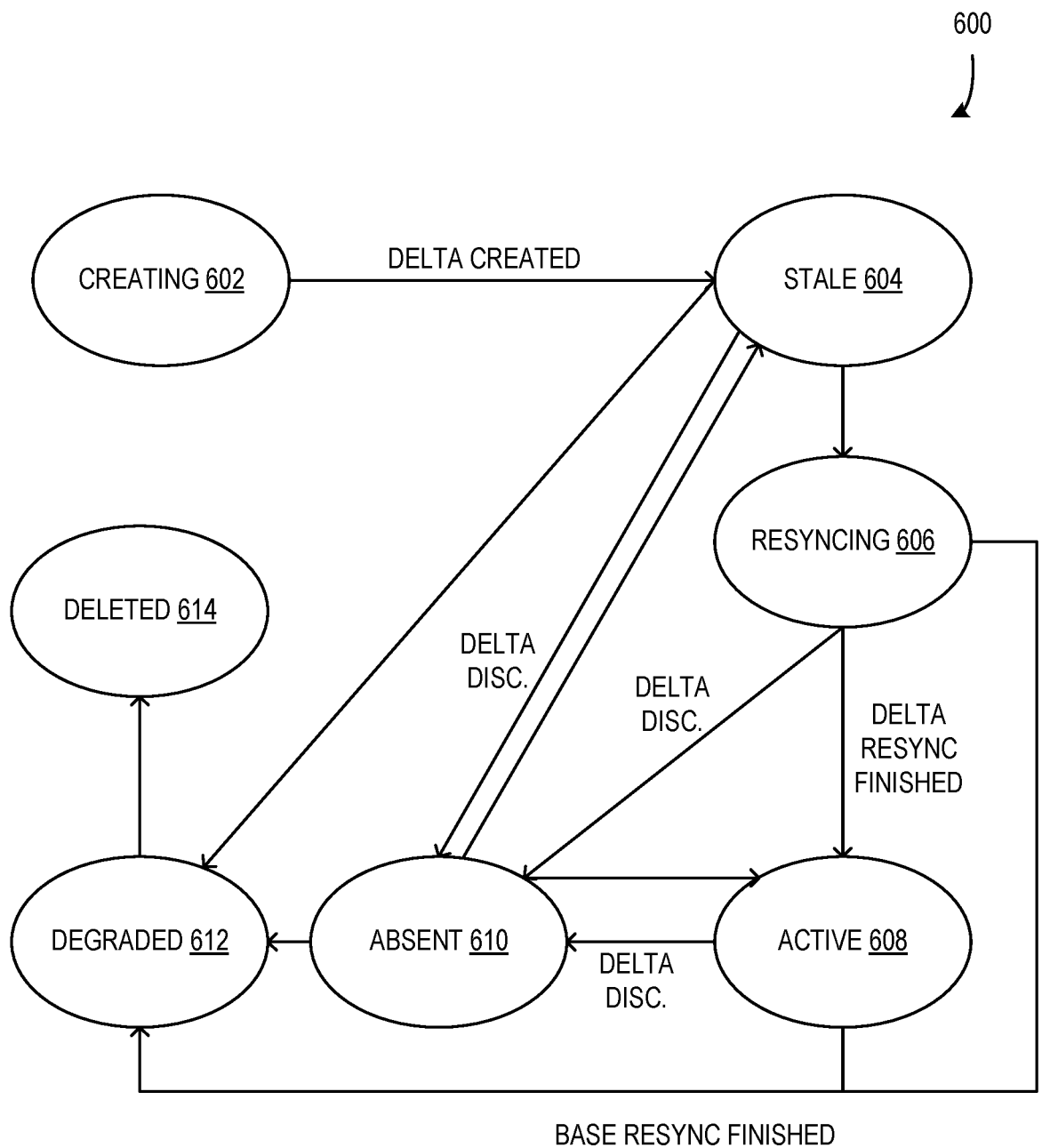
FIG. 6 is a state diagram illustrating states of a delta component.

FIG. 6 is a state diagram 600 illustrating states of a delta component according to an embodiment. In some examples, the delta component described in the state diagram 600 is used as part of a system such as system 200 of FIG. 2 as described herein. At a creating state 602, the delta component is created or otherwise generated as described herein. After it is created, the delta component is in a stale state 604. It is stale because it is created after the associated base component (e.g., base component 210) and it may have missed one or more write I/Os targeted at the base component during the time between the failure of the base component and the creation of the delta component. From the stale state 604, the delta component may enter the resyncing state 606, the absent state 610, or the degraded state 612.

At the resyncing state 606, the delta component may be resynched or otherwise synchronized with a mirrored component (e.g., mirrored component 212) of the base component. Upon completion of the resync process, the delta component may enter the active state 608.

At the active state 608, the delta component may be configured to receive and track write I/Os intended or targeted for the associated base component while the base component is unavailable, as described herein.

When the base component becomes available again, the delta component may be used to resync or otherwise synchronize with the base component to bring it up to date. The delta component may resync with the base component from the resyncing state 606 or the active state 608. When the resync with the base component is finished, the purpose of the delta component is complete and it may enter the degraded state 612, after which it will enter the deleted state 614 and be deleted.

At any time during the operation of the delta component (e.g., the stale state 604, the resyncing state 606, and/or active state 608) the delta component may disconnect from the system or otherwise become absent or unavailable, entering the absent state 610. If the delta component recovers from the absent state 610, it may enter the stale state 604 if it has missed a write I/O during its absence, or it may enter the active state 608. If the delta component moves from the absent state 610 to the stale state 604, it may be resynced to a mirrored component in the resyncing state 606 to get it back to the active state 608 so that it can resume operation as a delta component for the unavailable base component.

Alternatively, if the delta component does not recover from the absent state 610, it may enter the degraded state 612 and then be deleted when it enters the deleted state 614.

Figure 7:
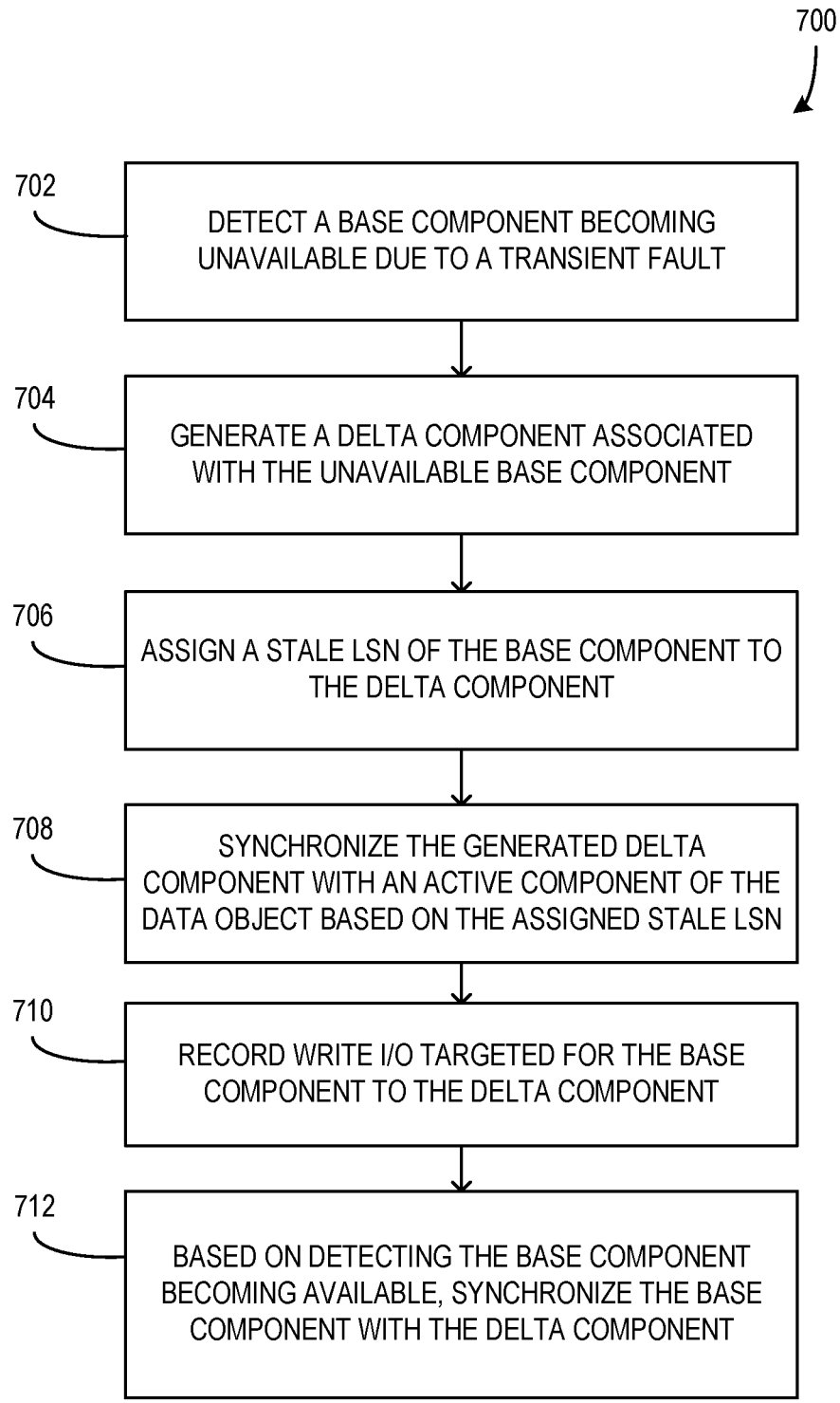
FIG. 7 is a flowchart illustrating a computerized method for enhancing data durability of a base component of a data object using a delta component during transient fault unavailability.

FIG. 7 is a flowchart illustrating a computerized method 700 for enhancing data durability of a base component (e.g., base component 210) of a data object using a delta component (e.g., delta component 214) during transient fault unavailability according to an embodiment. In some examples, the method 700 is performed or otherwise executed in a system such as system 200 of FIG. 2 as described herein. At 702, a base component becoming unavailable due to a transient fault is detected in the system. The base component may be associated with a stale LSN indicative of a write I/O that was committed on active components of the data object prior to the detection of the base component becoming unavailable. In some examples, the detection of the base component's unavailability may be based on detection of host failures, disk group failures, individual disk failures, network slowness failures, or the like. Such transient failures may be detected by software on the host of the base component and/or software hosted on other devices or components of the system (e.g., based on slow or failed network communications from the host of the base component, based on an error message associated with the base component, etc.).

At 704, a delta component associated with the unavailable base component is generated. In some examples, the delta component is configured to include unwritten storage space with an address space matching an address space of the unavailable base component and a tracking bitmap including a plurality of bits associated with data blocks of the address space of the delta component. Further, generation of the delta component may include determination of a fault domain placement of the delta component based on defined fault domain placement rules. Such rules may identify a fault domain placement for the delta component based on available resources of the fault domain and lack of components of the data object of the base component (e.g., the delta component should be placed on a fault domain separate from the base component and/or any mirrored components to maintain data durability in case of fault domain failure).

In some examples, fault domain placement determination may be performed or otherwise executed prior to the detection of the unavailability of the base component. The system may be configured to detect an indicator of likely failure of the base component (e.g., detecting a slow down in many different write I/O processes associated with the base component) and based on that detection, determining the fault domain placement. The determined fault domain placement may then be cached and used during generation of a delta component if the base component does become unavailable as predicted.

Additionally, or alternatively, determination of fault domain placements may be performed periodically based on a defined time interval and such fault domain placements may be cached or otherwise stored for use in generating delta components as described herein.

At 706, the stale LSN of the base component is assigned to the generated delta component. As a result of the assignment, the base component and delta component share the stale LSN, and the delta component is configured to track all write I/O-based changes in order to bring the base component up to date when it becomes available again.

At 708, the generated delta component is synchronized with an active component of the data object based on the assigned stale LSN. In some examples, one or more active components of the data object (e.g., mirrored components 212) are configured to start a tracking bitmap associated with the stale LSN of the base component based on the base component becoming unavailable. Using these tracking bitmaps, the active components are configured to track write I/O-based changes during the downtime of the base component. Because the active component has tracked all changes since the base component became unavailable, it has a record of all write I/O necessary to bring the recently generated delta component up to date. Such synchronization may include updating data blocks of the delta component based on the active component and updating the tracking bitmap of the delta component based on the tracking bitmap of the active component.

In some examples, the processes associated with generating the delta component and with synchronizing the generated delta component with an active component are prioritized over other processes by an object manager of the data object as described herein. For instance, processes associated with fault domain placement determination and with delta component synchronization may be prioritized over other processes, such as write I/O processes on the system.

At 710, write I/O targeted for the base component is recorded to the delta component. In some examples, the recording of the write I/O includes making changes to data blocks based on the write I/O and changing bits of the tracking bitmap based on the changes made to the data blocks. For instance, if a tracking bit of a data block is '0', indicating that it has not been changed and the write I/O causes the data block to be changed, the tracking bit of the data block is updated to '1', indicating that the data block has been changed. Once a tracking bit of a data block indicates that it has been changed, that tracking bit is not changed again.

At 712, based on detecting the base component becoming available, the base component is synchronized with the delta component. In some examples, the synchronization includes updating the data blocks of the base component based on the delta component and the associated tracking bitmap. For instance, the process identifies data blocks of the base component to synchronize based on the bits of the tracking bitmap that indicate changed data blocks, and then the data in those identified data blocks of the delta component is updated or otherwise copied to the equivalent data blocks of the base component.

In some examples, once the base component is synchronized and brought up to date, the purpose of the delta component is fulfilled, and it may be degraded and/or deleted. Alternatively, or additionally, the delta component may be maintained for data durability purposes or other purposes without departing from the description.

Further, in some examples, during the time when the delta component is synchronized and recording write I/Os for the base component, if the delta component becomes temporarily unavailable for some reason (e.g., a transient failure as described herein), upon recovery, the delta component may be resynchronized with an active component of the data object and, once up to date, it may resume recording the write I/Os for the base component as described herein.

In some examples, a resumable resynchronization, or resumable resync, feature is used during resyncing of components of data objects. In such cases, if tracking bitmaps are used to track changes as described herein, a resync LSN or rLSN should be the same value as the stale LSN of the base component when the delta is created. Additionally, or alternatively, the rLSN may differ from the stale LSN if the resumable resync feature is enabled and a resync's range has been determined. If the current resync job exits due to absence of the base component, or any other temporary failures, the next rLSN with which a resumed resync is associated for the base component is set using the last committed write LSN on the object. If the rLSN and staleLSN differ (e.g., rLSN is greater than staleLSN), the tracking bitmaps or other data structures on the active components of the data object may have been deleted (e.g., the write I/Os from the stale LSN up to the rLSN which may have already been determined/resynced on the base component). As a result, the delta component will not be resynced with all the writes from staleLSN till now. Alternatively, if the system is configured to record write I/O LSN's for each data block, this step may be ignored because the system will always have access to the correct set of missed write I/Os by querying those recorded write I/Os.

Further, in some examples, the number of object state change operations on the data object may be increased due to the implementation of unplanned delta components as described herein. For instance, when the object becomes eventually available (EDA) (e.g., the object is currently not alive because it has lost the last active component to sustain availability, but the base is connected and stale or resyncing, and the delta is active) from strictly available (SDA) (e.g., an availability state without delta components involved), object state change operations may increase significantly. Such an increase may cause an unnecessary increase of the sequence number of the configuration of the data object, rendering components stale that may not actually be stale in terms of lost written data. In such examples, the system is configured to prevent the unnecessary increase of the configuration sequence number by predicting events that could cause such changes, such as a resync of a base component that will not succeed due to disk space constraints. Changes to the configuration sequence number due to such predicted events may be prevented unless it is confirmed that the changes have successfully been completed.

In some examples, the use of delta components as described herein exposes some I/O paths that may cause a cycle (e.g., a cycle may cause a second read issued to a delta component to shift to an unwritten region where it should not be shifted). The described system may be configured to perform checks to prevent such "reading holes" from happening. A first check is to ensure that the cycle ends when any read is outside the range of the originating read and a second check is to obtain the allocation information on the LSOM side, along with the read payload, to determine if the read data is valid (e.g., reading written locations, which is valid, or unwritten locations, which is invalid). In other examples, more, fewer, or different checks may be used to prevent such cycles without departing from the description.

Additional Examples

In an example, a transient failure of a base component of a distributed data object is detected based on indications that the host of the base component has failed temporarily. Because the failure of the host is likely to be temporary, the system initiates the generation of a delta component as described herein. The system determines an available fault domain upon which the delta component can be placed, as it does not include any other components of the distributed data object. The delta component is generated on the determined fault domain.

The stale LSN of the failed and unavailable base component is shared to the delta component and/or associated with the tracking bitmap of the delta component. During the time between the initial unavailability of the base component and the generation of the delta component, write I/O traffic to the base component was missed by the base component and the delta component. Thus, the base component and the delta component are considered "stale". Before the delta component can become active and track write I/O traffic to the base component as intended, it must be brought up to date.

The delta component is then synchronized with an active component of the data object (e.g., a mirrored component of the base component) based on the shared stale LSN. A tracking bitmap of the active component is used to update the data blocks and tracking bitmap of the delta component to bring it up to date. When the delta component is synchronized and up to date, it becomes active and begins recording the write I/Os targeted at the base component, providing data durability for the data space of the base component while it is unavailable.

In another example, during the period when the delta component is active and recording write I/Os targeted at the base component, the delta component becomes unavailable due to a transient failure. When it becomes available again, it has become stale. To bring it back up to date, the delta component may be resynchronized with an active component of the data object based on an LSN indicative of when the delta component became unavailable. In this way, delta components can be recovered after failure, rather than just being degraded, and deleted.

In another example, the system is configured to monitor performance and other aspects of operations of the system to predict future transient failures of base components. Based on a prediction, the system is configured to pre-determine a fault domain placement for a delta component for the base component that is predicted to fail. If the base component does fail within a particular timeframe of the pre-determined fault domain placement, that fault domain placement is used, reducing the time required to generate and activate the delta component.

In another example, the system attempts to create a delta component but is unable to do so (e.g., there is no available fault domain on which to place the delta component). The system is configured to retry the creation of the delta component one or more times within a defined timeframe from the first creation attempt. If the timeframe expires without a delta component being successfully created, the system may give up on the creation of the delta component. In such cases, the system may be configured to perform other operations to improve data durability or otherwise protect the data of the base component without departing from the description.

In another example, a base component becomes unavailable due to a failure within the associated system, and it is predicted that the failure is permanent rather than transient. Based on this prediction, a delta component is not created as described herein. The prediction of the permanence of the failure may be based on an indicator of the type of failure (e.g., a failure that is known to be permanent, a failure that is permanent more than 50% of the time (or a different threshold percentage), or the like). Alternatively, or additionally, the system may be configured to track past failures and associated operation patterns to train a machine learning model that is configured to classify future failures as temporary/transient or permanent. The classifications made by such a model may be used to determine whether the system uses a delta component as described herein or not. For instance, if a failure is classified as permanent, the system refrains from initiating the delta component creation process, saving the resource costs associated therewith. The training data for such a model may include indicators of failure types, specific devices affected by the failures, specific locations within a network or geographic locations, specific customers or other entities associated with the data object or components associated with the failure, or the like.

Exemplary Operating Environment

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device. According to an embodiment, enhancing the data durability of a data object during a transient failure using an unplanned delta component as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for enhancing data durability of a base component of a data object using a delta component during transient fault unavailability comprises: at least one processor; and at least one memory comprising computer program code, the at least one memory and the computer program code configured to, with the at least one processor, cause the at least one processor to: detect a base component of a data object becoming unavailable due to a transient fault, wherein the base component is associated with a stale log sequence number (LSN) indicative of a write I/O that was committed on one or more active components of the data object prior to detection of the base component becoming unavailable; generate a delta component associated with the base component, wherein the delta component is configured to include (i) unwritten storage space with an address space matching an address space of the base component and (ii) a tracking bitmap including a plurality of bits associated with data blocks of the address space of the delta component; assign the stale LSN with which the base component is associated to the delta component; synchronize the generated delta component with an active component of the data object based on the assigned stale LSN, wherein synchronizing includes updating the address space and the tracking bitmap of the delta component; record write I/O targeted for the base component to the delta component, including updating the tracking bitmap of the delta component; and based on detecting the base component becoming available, synchronize the base component with the delta component using at least the tracking bitmap of the delta component.

An example method for enhancing data durability of a base component of a data object using a delta component during transient fault unavailability comprises: detecting, by a processor, a base component of a data object becoming unavailable due to a transient fault, wherein the base component is associated with a stale log sequence number (LSN) indicative of a write I/O that was committed on one or more active components of the data object prior to detection of the base component becoming unavailable; generating, by a processor, a delta component associated with the base component, wherein the delta component is configured to include (i) unwritten storage space with an address space matching an address space of the base component and (ii) a tracking bitmap including a plurality of bits associated with data blocks of the address space of the delta component; assigning, by the processor, the stale LSN with which the base component is associated to the delta component; synchronizing, by the processor, the generated delta component with an active component of the data object based on the assigned stale LSN, wherein synchronizing includes updating the address space and the tracking bitmap of the delta component; recording, by the processor, write I/O targeted for the base component to the delta component, including updating the tracking bitmap of the delta component; and based on detecting the base component becoming available, synchronizing, by the processor, the base component with the delta component using at least the tracking bitmap of the delta component.

One or more computer storage media have computer-executable instructions for enhancing data durability of a base component of a data object using a delta component during transient fault unavailability, upon execution by a processor, cause the processor to at least: detect a base component of a data object becoming unavailable due to a transient fault, wherein the base component is associated with a stale log sequence number (LSN) indicative of a write I/O that was committed on one or more active components of the data object prior to detection of the base component becoming unavailable; generate a delta component associated with the base component, wherein the delta component is configured to include (i) unwritten storage space with an address space matching an address space of the base component and (ii) a tracking bitmap including a plurality of bits associated with data blocks of the address space of the delta component; assign the stale LSN with which the base component is associated to the delta component; synchronize the generated delta component with an active component of the data object based on the assigned stale LSN, wherein synchronizing includes updating the address space and the tracking bitmap of the delta component; record write I/O targeted for the base component to the delta component, including updating the tracking bitmap of the delta component; and based on detecting the base component becoming available, synchronize the base component with the delta component using at least the tracking bitmap of the delta component.

Alternatively, or in addition to the other examples described herein, examples include any combination of the following:

wherein detecting the base component of the data object becoming unavailable due to a transient fault includes detecting at least one of the following: detecting a host failure of the base component, detecting a disk group failure of the base component, detecting an individual disk failure of the base component, and detecting a network slowness failure of the base component.

further comprising: detecting, by the processor, the delta component becoming unavailable, wherein the delta component is associated with a resync LSN indicative of a write I/O that was committed by the delta component prior to becoming unavailable; and based on detecting the delta component becoming available, resynchronizing, by the processor, the delta component with the active component of the data object based on the resync LSN, wherein synchronizing includes updating the address space and the tracking bitmap of the delta component.

wherein generating the delta component associated with the base component further includes: determining, by the processor, a fault domain placement for the delta component; and generating, by the processor, the delta component on a fault domain based on the determined fault domain placement.

further comprising: detecting, by the processor, an indicator of likely failure of the base component prior to the base component becoming unavailable, wherein determining the fault domain placement for the delta component is performed based on the detected indicator of likely failure; caching, by the processor, the fault domain placement for the delta component; and wherein the cached fault domain placement for the delta component is used to generate the delta component on the fault domain.

wherein determining the fault domain placement for the delta component includes determining the fault domain placement periodically per defined time interval and caching the determined fault domain placement for use in generating the delta component.

wherein processes associated with generating the delta component associated with the base component and with synchronizing the generated delta component with an active component of the data object based on the assigned stale LSN are prioritized over other processes by an object manager of the data object, wherein the prioritized processes include at least one of the following: fault domain placement processes and delta component synchronization processes.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for detecting, by a processor, a base component of a data object becoming unavailable due to a transient fault, wherein the base component is associated with a stale log sequence number (LSN) indicative of a write I/O that was committed on active components of the data object prior to detection of the base component becoming unavailable; exemplary means for generating, by a processor, a delta component associated with the base component, wherein the delta component is configured to include unwritten storage space with an address space matching an address space of the base component and a tracking bitmap including a plurality of bits associated with data blocks of the address space of the delta component; exemplary means for assigning, by the processor, the stale LSN with which the base component is associated to the delta component; exemplary means for synchronizing, by the processor, the generated delta component with an active component of the data object based on the assigned stale LSN, wherein synchronizing includes updating the address space and the tracking bitmap of the delta component; exemplary means for recording, by the processor, write I/O targeted for the base component to the delta component, including updating the tracking bitmap of the delta component; and based on detecting the base component becoming available, exemplary means for synchronizing, by the processor, the base component with the delta component using the tracking bitmap of the delta component.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for enhancing data durability of a base component of a data object using a delta component during an unplanned transient fault, the method comprising: detecting, by a processor, a base component of a data object becoming unavailable due to the unplanned transient fault, wherein the base component of the data object is associated with a stale log sequence number (LSN) indicative of a write input/output (I/O) that was committed on one or more active components of the data object prior to detection of the base component of the data object becoming unavailable; responsive to the detecting of the base component of the data object becoming unavailable, generating, by a processor, a delta component associated with the base component of the data object, wherein the delta component is configured to include (i) unwritten storage space with an address space matching an address space of the base component of the data object and (ii) a tracking bitmap including a plurality of bits associated with data blocks of the address space of the delta component; assigning, by the processor, the stale LSN with which the base component of the data object is associated to the delta component; synchronizing, by the processor, the generated delta component with an active component of the data object based on the assigned stale LSN, wherein synchronizing includes updating the address space and the tracking bitmap of the delta component; storing, by the processor, write I/Os targeted for the base component of the data object to the delta component, including updating the tracking bitmap of the delta component; and based on detecting the base component of the data object becoming available, synchronizing, by the processor, the base component of the data object with the delta component using at least the tracking bitmap of the delta component.

2. The method of claim 1, wherein the synchronizing comprises copying only changed data blocks of the address space of the delta component to corresponding data blocks of the address space of the base component of the data object.

3. The method of claim 1, further comprising:
detecting, by the processor, the delta component becoming unavailable, wherein the delta component is associated with a resync LSN indicative of a write I/O that was committed by the delta component prior to becoming unavailable; and
based on detecting the delta component becoming available, resynchronizing, by the processor, the delta component with the active component of the data object based on the resync LSN, wherein synchronizing includes updating the address space and the tracking bitmap of the delta component.

4. The method of claim 1, wherein generating the delta component associated with the base component of the data object further includes: determining, by the processor, a fault domain placement for the delta component; and generating, by the processor, the delta component on a fault domain based on the determined fault domain placement.

5. The method of claim 4, further comprising: detecting, by the processor, an indicator of likely failure of the base component of the data object prior to the base component of the data object becoming unavailable, wherein determining the fault domain placement for the delta component is performed based on the detected indicator of likely failure; caching, by the processor, the fault domain placement for the delta component; and wherein the cached fault domain placement for the delta component is used to generate the delta component on the fault domain.

6. The method of claim 1, wherein generation of the delta component associated with the base component of the data object is performed in background, allowing the one or more active components of the data object to continue to process write I/Os during downtime of the base component of the data object.

7. The method of claim 1, wherein processes associated with generating the delta component associated with the base component of the data object and with synchronizing the generated delta component with an active component of the data object based on the assigned stale LSN are prioritized over other processes by an object manager of the data object, wherein the prioritized processes include at least one of the following: fault domain placement processes and delta component synchronization processes.

8. A system for enhancing data durability of a base component of a data object using a delta component during an unplanned transient fault, the system comprising: at least one processor; and at least one memory comprising computer program code, the at least one memory and the computer program code configured to, with the at least one processor, cause the at least one processor to: detect a base component of a data object becoming unavailable due to the unplanned transient fault, wherein the base component of the data object is associated with a stale log sequence number (LSN) indicative of a write input/output (IO) that was committed on one or more active components of the data object prior to detection of the base component of the data object becoming unavailable; responsive to the detecting of the base component of the data object becoming unavailable, generate a delta component associated with the base component of the data object, wherein the delta component is configured to include (i) unwritten storage space with an address space matching an address space of the base component of the data object and (ii) a tracking bitmap including a plurality of bits associated with data blocks of the address space of the delta component; assign the stale LSN with which the base component of the data object is associated to the delta component; synchronize the generated delta component with an active component of the data object based on the assigned stale LSN, wherein synchronizing includes updating the address space and the tracking bitmap of the delta component; store write I/Os targeted for the base component of the data object to the delta component, including updating the tracking bitmap of the delta component; and based on detecting the base component of the data object becoming available, synchronize the base component of the data object with the delta component using at least the tracking bitmap of the delta component.

9. The system of claim 8, wherein detecting the base component of the data object becoming unavailable due to the unplanned transient fault includes detecting at least one of the following: detecting a host failure of the base component of the data object, detecting a disk group failure of the base component of the data object, detecting an individual disk failure of the base component of the data object, and detecting a network slowness failure of the base component of the data object.

10. The system of claim 8, wherein the at least one memory and the computer program code are configured to, with the at least one processor, further cause the at least one processor to:
- detect the delta component becoming unavailable, wherein the delta component is associated with a resync LSN indicative of a write I/O that was committed by the delta component prior to becoming unavailable; and
- based on detecting the delta component becoming available, resynchronizing the delta component with the active component of the data object based on the resync LSN, wherein synchronizing includes updating the address space and the tracking bitmap of the delta component.

11. The system of claim 8, wherein generating the delta component associated with the base component of the data object further includes: determining a fault domain placement for the delta component; and generating the delta component on a fault domain based on the determined fault domain placement.

12. The system of claim 11, wherein the at least one memory and the computer program code are configured to, with the at least one processor, further cause the at least one processor to: detect an indicator of likely failure of the base component of the data object prior to the base component of the data object becoming unavailable, wherein determining the fault domain placement for the delta component is performed based on the detected indicator of likely failure; cache the fault domain placement for the delta component; and wherein the cached fault domain placement for the delta component is used to generate the delta component on the fault domain.

13. The system of claim 8, wherein the synchronizing comprises copying only changed data blocks of the address space of the delta component to corresponding data blocks of the address space of the base component of the data object.

14. The system of claim 8, wherein generating the delta component associated with the base component of the data object is performed in background, allowing the one or more active components of the data object to continue to process write I/Os during downtime of the base component of the data object.

15. One or more computer storage media having computer-executable instructions for enhancing data durability of a base component of a data object using a delta component during an unplanned transient fault that, upon execution by a processor, cause the processor to at least: detect a base component of a data object becoming unavailable due to the unplanned transient fault, wherein the base component of the data object is associated with a stale log sequence number (LSN) indicative of a write input/output (IO) that was committed on one or more active components of the data object prior to detection of the base component of the data object becoming unavailable; responsive to the detecting of the base component of the data object becoming unavailable, generate a delta component associated with the base component of the data object, wherein the delta component is configured to include (i) unwritten storage space with an address space matching an address space of the base component of the data object and (ii) a tracking bitmap including a plurality of bits associated with data blocks of the address space of the delta component; assign the stale LSN with which the base component of the data object is associated to the delta component; synchronize the generated delta component with an active component of the data object based on the assigned stale LSN, wherein synchronizing includes updating the address space and the tracking bitmap of the delta component; store write I/Os targeted for the base component of the data object to the delta component, including updating the tracking bitmap of the delta component; and based on detecting the base component of the data object becoming available, synchronize the base component of the data object with the delta component using at least the tracking bitmap of the delta component.

16. The one or more computer storage media of claim 15, wherein detecting the base component of the data object becoming unavailable due to the unplanned transient fault includes detecting at least one of the following: detecting a host failure of the base component of the data object, detecting a disk group failure of the base component of the data object, detecting an individual disk failure of the base component of the data object, and detecting a network slowness failure of the base component of the data object.

17. The one or more computer storage media of claim 15, wherein the computer-executable instructions, upon execution by a processor, further cause the processor to at least:
- detect the delta component becoming unavailable, wherein the delta component is associated with a resync LSN indicative of a write I/O that was committed by the delta component prior to becoming unavailable; and
- based on detecting the delta component becoming available, resynchronizing the delta component with the active component of the data object based on the resync LSN, wherein synchronizing includes updating the address space and the tracking bitmap of the delta component.

18. The one or more computer storage media of claim 15, wherein generating the delta component associated with the base component of the data object further includes: determining a fault domain placement for the delta component; and generating the delta component on a fault domain based on the determined fault domain placement.

19. The one or more computer storage media of claim 18, wherein the computer-executable instructions, upon execution by a processor, further cause the processor to at least: detect an indicator of likely failure of the base component of the data object prior to the base component of the data object becoming unavailable, wherein determining the fault domain placement for the delta component is performed based on the detected indicator of likely failure; cache the fault domain placement for the delta component; and wherein the cached fault domain placement for the delta component is used to generate the delta component on the fault domain.

20. The one or more computer storage media of claim 18, wherein generation of the delta component associated with the base component of the data object is performed in background, allowing the one or more active components of the data object to continue to process write I/Os during downtime of the base component of the data object.

\* \* \* \* \*